United States Patent [19]

Lutz

[11] 3,930,124

[45] Dec. 30, 1975

[54] PCM TIME-DIVISION MULTIPLEX TELECOMMUNICATION NETWORK

[75] Inventor: Karl-Anton Lutz, Munich, Germany

[73] Assignee: Siemens Aktiengesellschaft, Berlin & Munich, Germany

[22] Filed: June 25, 1974

[21] Appl. No.: 483,021

[30] Foreign Application Priority Data

June 29, 1973 Germany............................ 2333254

[52] U.S. Cl...... 179/15 AT; 179/15 BV; 179/15 AQ

[51] Int. Cl.[2] ............................................ H04J 3/16

[58] Field of Search...... 179/15 AT, 15 AQ, 15 BV, 179/15 BW

[56] References Cited

UNITED STATES PATENTS 3,794,768 2/1974 Carney........................... 179/15 BV

*Primary Examiner*—Ralph D. Blakeslee

[57] ABSTRACT

For the through-connection of PCM basic systems and PCM superordinate systems, some of which form a single transmission channel, there are provided a time-division multiplex switching network which only switches time-derived channels of basic systems. The network, as well, switches pairs of space-division multiplex switching networks assigned symmetrically thereto which either switch through directly or transfer to demultiplexers (or receive from multiplexers) superordinate systems and entire basic systems.

1 Claim, 1 Drawing Figure

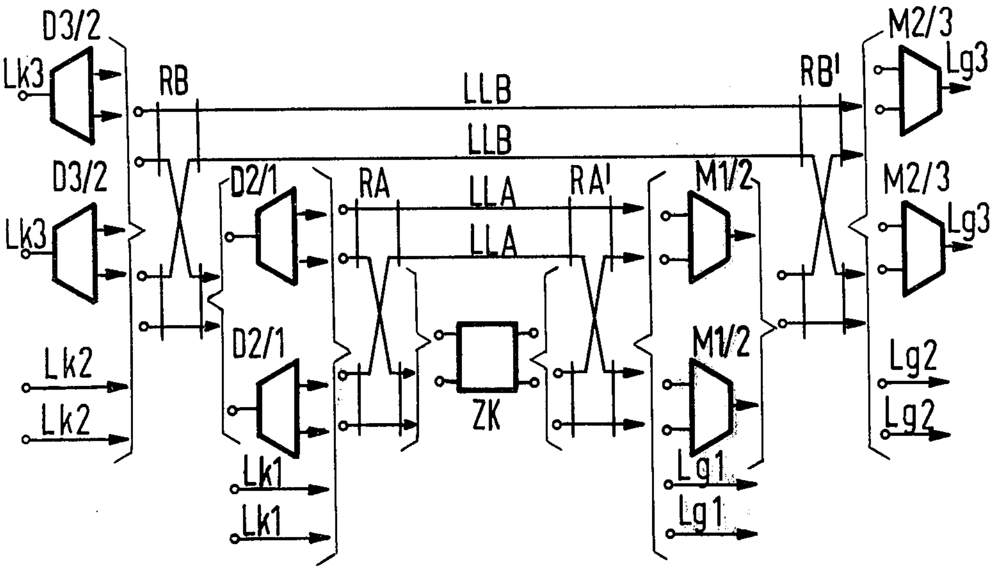
D3/2
Lk3
RB
LLB
LLB
RB'
M2/3
Lg3
D3/2
Lk3
D2/1
RA
LLA
LLA
RA'
M1/2
M2/3
Lg3
D2/1
ZK
M1/2
Lk2
Lk2
Lg2
Lg2
Lk1
Lk1
Lg1
Lg1

PCM TIME-DIVISION MULTIPLEX TELECOMMUNICATION NETWORK

BACKGROUND OF THE INVENTION

In connection with the transmission of telephone information, the most significant characteristics of pulse code modulated (PCM) basic systems have been laid down through international agreements. The obligatory basic system for Europe has 32 time slots of eight bits each used for 30 telephone channels, 1 synchronization channel and 1 signalling channel for the transmission of the signalling criteria for all 30 telephone channels. The length of a pulse frame which, accordingly, contains 256 bits, is 125 $\mu$s, which corresponds to a bit rate of 2.048 Mbits per second. If every one of the available time slots is used for transmitting another unit of information, 64 k bits per second are available for each telephone connection.

If units of information must be transmitted in such telecommunication networks requiring a higher bit rate, e.g., radio information, several channels of such a basic system can be occupied for transmitting one and the same unit of information (NTZ 1967, No. 1, pp. 667–682). Difficulties may be experienced when switching such units of information requiring several time slots if several central offices must be passed in which time slot conversions are effected, since then the original time slot sequence is not maintained without special provision.

It has therefore been proposed (British pat. application Ser. No. 13 810/73 to initially switch the individual time slots used for a single unit of information without regard to their interrelationship and then to bring them back, at the receiver, to their original sequence by means of an appropriate device. To save the technical effort required for this solution, it has moreover been proposed to occupy equidistant time slots for information using several time slots, and when 3 occupying time slots requiring only one time slot, to proceed in such a way that rows of equidistant time slots remain idle as long as possible. These time slots, thereafter, are occupied for information requiring several time slots (British patent application Ser. No. 99 04/73).

Efforts are being made, in addition to the radio information mentioned by way of example hereinabove, to also transmit information over PCM telecommunication networks designed primarily for telephone systems, for which such a high bit rate must be made available that entire PCM basic systems are needed, or that even the bit rate available in a PCM basic system is no longer adequate. This, for instance, is the case when transmitting information pertaining to videotelphony where, in certain circumstances, a bit rate of 8 Mbits per second may be expected.

It has, therefore, been proposed to build PCM superordinate systems made up of several PCM basic systems by interleaving, on a time-division basis, the time periods pertaining to these basic systems (cf. NTZ Report 8, 1971, which is in the English language, and NTZ, No. 6, 1971, pp. 314–320). As laid down therein, 4 PCM basic systems with a bit rate of 2.048 Mbits per second must be combined into a second order PCM system with a bit rate of 8.448 Mbits per second, 4 such second order PCM systems into a third order PCM system with 34.816 Mbits per second, and so on. If among the information transmitted in such PCM superordinate systems there are videotelephony data having said bit rate of 8.448 Mbits per second, an entire second order PCM system order would be used for a single video-telephone channel.

In accordance with the above handling of, for example, radio information during the switching, it would be obvious to also start from individual time slots of the PCM basic systems when switching, for example, videotelephony signals, for which at any rate an uninterleaving of all the PCM superordinate systems into PCM basic systems would be necessary. This procedure would appear as the most suitable one particularly since in normal cases in the PCM superordinate systems there is also always information requiring only a fairly low bit rate, for example, telephone information. For the transmission of telephone information one time slot at a time is used, so that at any rate an uninterleaving into PCM basic systems must be effected. However, during the handling of information having a fairly high bit rate, the above difficulties in connection with the retention and recovery of the original sequence of the time slots occupied for transmitting a single unit of information would be experienced. Because of the substantially higher number of time slots to be considered in connection with a single unit of information, it stands to reason that these difficulties would be less easy to avoid. Therefore, if one were to use time-division multiplex switching networks in the individual central offices for the timely switching of entire PCM superordinate systems, considerable slippage losses would have to be considered, since for the present it still cannot be expected that the individual PCM superordinate systems can operate synchronously. Thus, existing phase differences must be taken into consideration through buffering and, the time when the buffer storages are either completely filled or completely emptied, through periodic suppression or periodic repetition of parts of information, considering the loss caused thereby, the different phase relationships must be considered.

It is an object of the invention to provide a PCM time-division multiplex telecommunication network which overcomes the difficulties described hereinabove.

SUMMARY OF THE INVENTION

The invention relates to a PCM time-division multiplex telecommunication network having a plurality of PCM time-division multiplex central offices interconnected via time-division multiplex lines. On at least one part of the time-division multiplex lines PCM superordinate systems are constructed by interleaving, on a time-division basis, time periods pertaining to PCM basic systems. In the network in addition to telephone data, data are transmitted for which all the time periods of a PCM basic system or PCM superordinate system are used for the formation of a single transmission channel.

According to the invention, the PCM time-division telecommunication network is characterized in that in the individual time-division multiplex central offices the through-connecting devices for connecting incoming time-division multiplex lines to outgoing time-division multiplex lines each have a time-division multiplex switching network and at least one pair of space-division multiplex switching networks. The parts of the system disposed at the receiver and transmitter of the time-division multiplex switching network, through the connection of outputs of the receiver to inputs of the transmitter are directly connected to one another.

The inputs of the receiver parts of the pairs of space-division multiplex networks are connected to the outputs of demultiplexers for the uninterleaving of higher order PCM systems into PCM systems of the next lower order and/or to time-division multiplex interchange trunks for PCM systems of the latter order. The outputs of the transmitting parts of the space-division multiplex switching networks are connected to the inputs of multiplexers for the interleaving of lower order PCM systems into PCM systems of the next higher order and/or to time-division multiplex lines for PCM systems of the higher order. The outputs of the receiver parts of the pairs of space-division multiplex switching networks, not serving for the direct connection with the other part of the pair, insofar as it concerns the part of a pair of space-division multiplex switching networks for the through-connection of PCM basic systems, are connected to the inputs of the time-division multiplex switching network. Insofar as it concerns the parts of pairs of space-division multiplex switching networks for the through-connection of higher order PCM systems they are connected to the inputs of the corresponding multiplexers. The inputs of the transmitter parts of the pairs of space-division multiplex switching networks not serving for the direct connection to the other part of a pair, insofar as it concerns a part for the through-connection of PCM basic systems, are connected to the outputs of the time-division multiplex switching network, and insofar as it concerns a part for the through-connection of higher order PCM systems, are connected with the outputs of the corresponding multiplexers.

BRIEF DESCRIPTION OF THE DRAWING:

The principles of the invention will be more readily understood by reference to the description of a preferred embodiment given hereinbelow in conjunction with the single-FIGURE drawing which is a schematic diagram of a time-division multiplex telecommunication network constructed according to the invention.

DETAILED DESCRIPTION OF THE DRAWING:

The drawing shows a through-connecting unit constructed according to the invention for connecting incoming time-division multiplex lines to outgoing time-division multiplex lines. This unit is in the form as it is found in the individual time-division multiplex central offices of a PCM time-division multiplex telecommunication network.

The through-connecting unit has a time-division multiplex switching network ZK containing a number of crosspoint contacts operated according to the time-division multiplex principle, as well as a number of storages which are each capable of storing all the information bits occurring within the pulse frame of a PCM basic system and through appropriate control of the writing or readout serve to convert time slots. The time-division multiplex switching network may, for example, be constructed as the one described in Austrian Pat. No. 3,395,254.

The through-connecting unit shown in the drawing also has pairs of space-division multiplex networks RA, RA' and RB, RB', whose sections are located on the receive or send side of the time-division multiplex switching network. The pairs of space-division multiplex switching networks are assigned to PCM systems of different orders, i.e., the space-division multiplex switching networks RA and RA' to PCM basic systems, and the pair RB and RB' to second order PCM systems. These, therefore, operate at different clock frequencies. They are so structured that they are capable of establishing physically separated connecting paths for a plurality of PCM basic systems or second order PCM systems. The number of all the pairs of space-division multiplex switching networks available in a through-connecting unit depends on the order of PCM systems, among which are, moreover, systems that are occupied for the transmission of a single information channel. In the present example, it is assumed that 8.448 Mbits per second will be necessary for the information to be transmitted at the highest bit rate, i.e., second order PCM systems still require whole systems for transmitting the information. Accordingly, a pair of space-division multiplex switching networks are required for second order PCM systems.

Individual outputs of section RA of the first pair of spacedivision multiplex switching networks are connected over links LLA to individual inputs of the other section RA'. The remaining outputs of section RA are in communication with the inputs of the time-division multiplex switching network ZK; the remaining inputs of section RA' are connected to the outputs of the time-division multiplex switching network ZK.

The inputs of section RA of the first pair of space-division multiplex switching networks are connected to the outputs of demultiplexers D2/1 and to incoming time-division multiplex lines Lkl. The demultiplexers D2/1 serve to uniterleave second order PCM systems into first order PCM systems. The outputs of section RA' are each partly connected to an input of multiplexers M1/2, partly to outgoing time-division multiplex lines Lg over which information pertaining to PCM basic systems is transmitted. The multiplexers M1/2 serve to interleave PCM basic systems into second order PCM systems.

Some of the outputs of section RB of the second pair of space-division multiplex switching networks are each connected directly to another input of the other section RB' of the pair over links LLB. The remaining outputs of the receiver section RB of the pair of space-division multiplex switching networks are each connected to the input of another one of the demultiplexers D2/1. The remaining inputs of the transmitter section RB' are each connected to the input of another multiplexer M1/2.

The inputs of section RN of the second pair of space-division multiplex switching networks are connected to the outputs of demultiplexers D3/2 or to incoming time-division multiplex lines Lk2. The demultiplexers 3/2 serve to uninterleave third order PCM systems into second order PCM systems; the time-division multiplex lines Lk2 serve to transmit information pertaining to second order PCM systems. Similarly, the outputs of section RB' of the transmitter section RBl of the second pair of space-division multiplex switching networks are each connected to another input of the multiplexers M2/3 or to outgoing time-division multiplex lines Lg2. The multiplexers M2/3 serve to interleave second order PCM systems into third order PCM systems; the time-division multiplex lines Lg2 serve to transmit information pertaining to second order PCM systems.

Demultiplexers and multiplexers may, for example, be constructed in the manner described in "Review of the Electrical Communication Laboratories" 17 (1969), Nos. 5 and 6, pp. 362–375.

If the individual PCM systems are operated asynchronously, it is necessary to insert stuffing pulses when interleaving the same into PCM superordinate systems with a view to compensating phase differences which must be removed again from the pulse stream when uninterleaved into lower order PCM systems. In such a case, an appropriate device, what might be termed stuffing devices, must follow the multiplexers shown in the drawing, or destuffing devices must follow the demultiplexers D3/2 and D2/1 with a view to removing the stuffing pulses.

The processes taking place during the operation of the through-connecting unit mentioned hereinabove will now be discussed.

It is assumed that among the data to be transmitted none have such a high bit rate that they require an entire third order PCM system for a single transmission channel. Therefore, all the third order PCM systems travelling to the incoming time-division multiplex lines Lk3 in the central office are routed to four second order PCM systems of the space-division multiplex switching network with the aid of the demultiplexers D3/2. Data using a whole second order PCM system for a transmission channel are through-connected to the links LLB by means of the space-division switching network R3 and, as a result, travel to the transmitter section RB' of the second pair of space-division multiplex switching networks. By means of the latter space division multiplex switching networks they travel either to the inputs of the multiplexers M2/3, which they again interleave together with other second order PCM systems into third order PCM systems, or to timedivision multiplex lines Lg2 carrying second order PCM systems.

The remaining second order PCM systems are switched through by the receiver portion RB of the second pair of space-division multiplex switching networks to the inputs of demultiplexers D2/1 which uninterleave the same into four PCM basic systems each. The PCM basic systems are routed to the receiver section RA of the first pair of space-division multiplex switching networks together with further PCM basic systems coming in on the time-division multiplex lines Lk1. Information requiring a whole PCM basic system for a transmission channel, e.g., rapid data, is switched through by the section RA of the pair of space-division multiplex switching networks to the links LLA. The information travels from there to the transmitter section RA' of the pair of space-division multiplex switching networks, by which they are switched through either to the inputs of the multiplexers M1/2 or to outgoing time-division multiplex lines Lg1. The multiplexers M1/2 again interleave four PCM basic systems at a time into a second order PCM system, transferring the same to the transmitter section RB' of the second pair of space-division multiplex switching networks over which, as explained hereinabove, they travel either to the inputs of the multiplexers M2/3 or to outgoing time-division multiplex lines Lg2.

The remaining PCM basic systems are switched through by the receiver portion RA of the first pair of space-division multiplex switching networks to the inputs of the time-division multiplex switching network Zk. After being switched in accordance with the time-division multiplex principle, they travel to one of the outputs of the time-division multiplex switching network and from there to inputs of the transmitter portion RA' of the first pair of space-division multiplex switching networks. From there they follow the same path as the PCM basic systems routed directly to the switching network portion RA'. Thus, they travel either to outgoing time-division multiplex lines Lg1 or Lg2 or Lg3.

Since through-connecting paths separated by the space-division multiplex switching networks are made available for all the PCM super-ordinate systems and PCM basic systems, no separate delay elements or buffer storages are necessary. The slippage losses mentioned at the beginning of this application cannot occur either. Different distance/velocity lags or different phase relationships of the pulse frames, if any, PCM words or information bits can be compensated without additional technical effort via corresponding equipments which are at any rate available as component parts of the multiplexers.

The preferred embodiment described herein is intended only to be exemplory of the principles of the invention. It is contemplated that the described embodiment can be modified or changed while remaining within the scope of the invention as defined by the appended claims.

I claim:

1. In a PCM time division multiplex telecommunication network having a plurality of PCM time division multiplex central offices interconnected by means of time division multiplex lines, wherein on at least one part of the time division multiplex lines PCM superordinate systems are constituted by interleaving, on a time division basis, time periods pertaining to PCM basic systems, and wherein data are transmitted for which all the time periods of a PCM basic system or PCM superordinate system are used for the formation of a single transmission channel, the improvement comprising:

a time division multiplex switching network and at least one pair of space division multiplex switching networks in each central office, said space division networks having corresponding parts on the receive side of said time division network connected to corresponding send side parts through the connection of outputs of the receive side with inputs of the send side, demultiplexer means fo uninterleaving higher order PCM systems into PCM systems of the next lower order having outputs connected to inputs of receive side parts of the pair of space division multiplex networks, said receive side inputs being connected also to interexchange trunks, multiplexers for interleaving lower order PCM systems into PCM systems of the next higher order having inputs connected to outputs of send side parts of the space division multiplex networks, said send side outputs being connected also to time division multiplex lines for PCM systems of a higher order, means connecting receive side parts of space division multiplex switching networks not used for the direct connection with the other part of the pair, with respect to the part of the pair of space division networks for through - connecting PCM basic systems, to inputs of the time division network, and with respect to parts of the pair of space division networks for through - connecting higher order PCM systems, to inputs of corresponding ones of said multiplexers, means connecting inputs of send side parts of said pair of space division networks not used for direct connection with the other part of the pair, with respect to a part for through connecting PCM basic systems, to outputs of said time division network, and with respect to a part for through connecting higher order PCM systems to outputs of corresponding ones of said dimultiplexers.

* * * * *